(12) United States Patent
Imai et al.

(10) Patent No.: US 8,583,383 B2
(45) Date of Patent: Nov. 12, 2013

(54) METHOD OF MEASURING AXIAL FORCE OF BOLT AND INSTRUMENT FOR MEASURING AXIAL FORCE OF BOLT

(75) Inventors: Atsushi Imai, Saitama (JP); Tooru Imai, Saitama (JP)

(73) Assignees: Atsushi Imai, Asaka-shi, Saitama (JP); Tooru Imai, Asaka-shi, Saitama (JP); Akira Imai, Asaka-shi, Saitama (JP); Yutaka Imai, Asaka-shi, Saitama (JP); Satoshi Imai, Asaka-shi, Saitama (JP)

( * ) Notice: Subject to any disclaimer, the term of this patent is extended or adjusted under 35 U.S.C. 154(b) by 289 days.

(21) Appl. No.: 13/010,059

(22) Filed: Jan. 20, 2011

(65) Prior Publication Data

US 2011/0184666 A1      Jul. 28, 2011

(30) Foreign Application Priority Data

Jan. 22, 2010   (JP) .................................. 2010-11680

(51) Int. Cl.
*G06F 19/00*      (2011.01)
(52) U.S. Cl.
USPC ............................................................ 702/43

(58) Field of Classification Search
USPC ............................................................ 702/43
See application file for complete search history.

(56) References Cited

FOREIGN PATENT DOCUMENTS

JP         2006308342 A      11/2006

*Primary Examiner* — Tung S Lau
(74) *Attorney, Agent, or Firm* — McCormick, Paulding & Huber LLP

(57) ABSTRACT

A bolt-axial-force measuring method and instrument capable of easily and precisely measuring an axial force of a bolt are provided. The bolt is screw-joined and coupled to a piston of a bolt tensioner, and a hydraulic pressure is supplied to its pressure chamber so that the bolt is elongated by applying a tensile force equal to or more than a necessary bolt-fastening force. A nut separating from a fastened member due to the elongation of the bolt is seated again on the fastened member, and the hydraulic pressure in the pressure chamber is discharged to release the tensile force of the bolt. A pressure change of the pressure chamber from which the hydraulic pressure is discharged is detected by a pressure sensor, a point where a change rate of the pressure change detected by a measuring apparatus is suddenly reduced is detected as an inflection point, and a pressure value of the pressure chamber at the inflection point is multiplied by a pressure receiving area of the pressure chamber, whereby the axial force of the bolt is calculated.

5 Claims, 10 Drawing Sheets

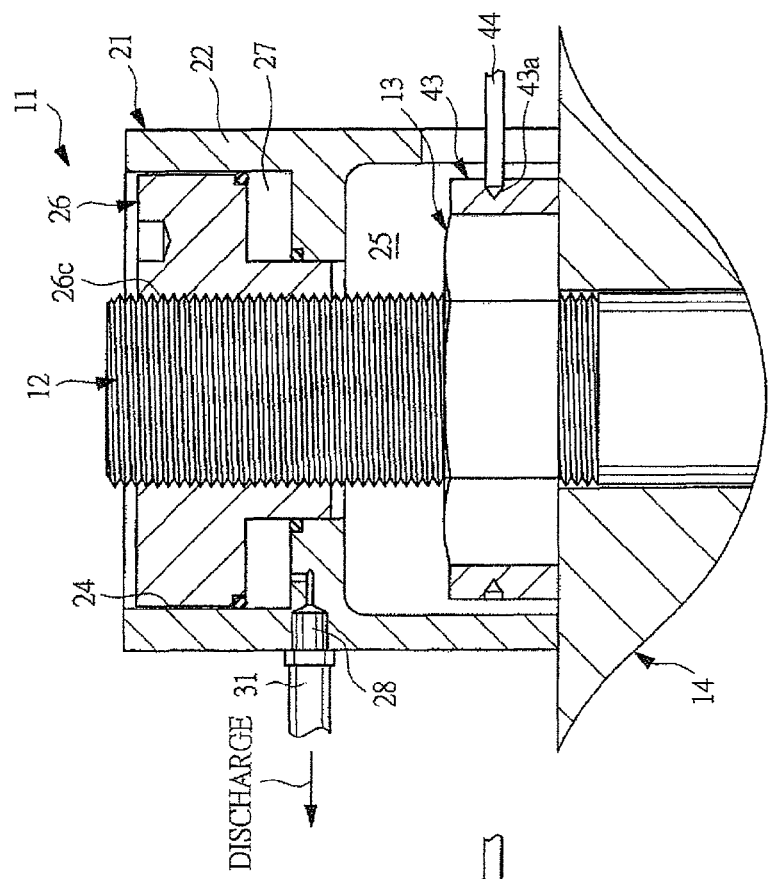
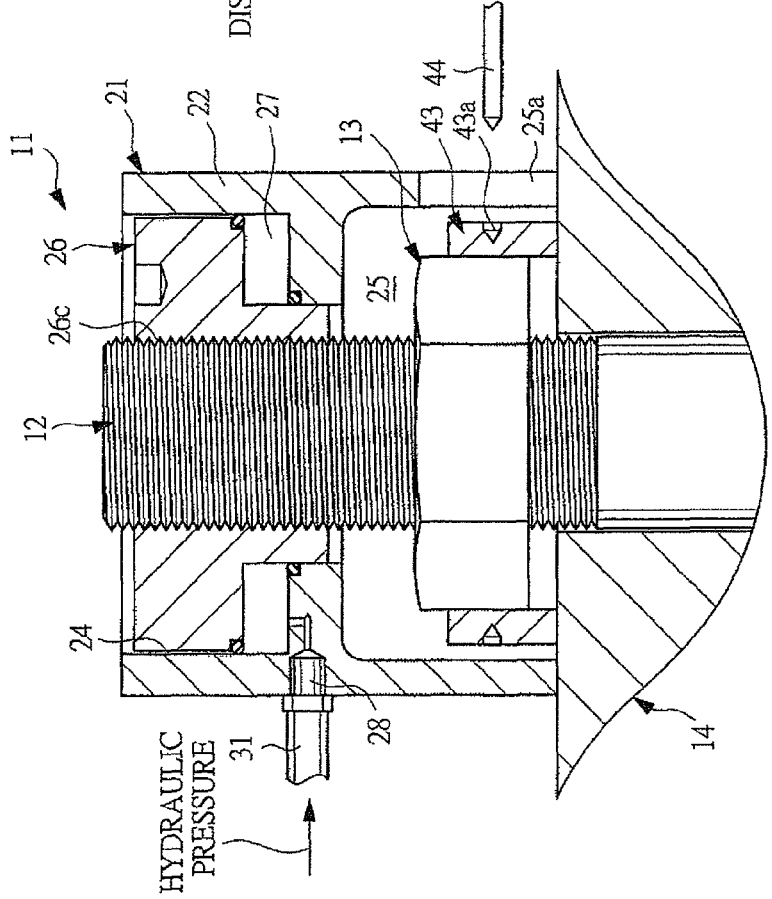

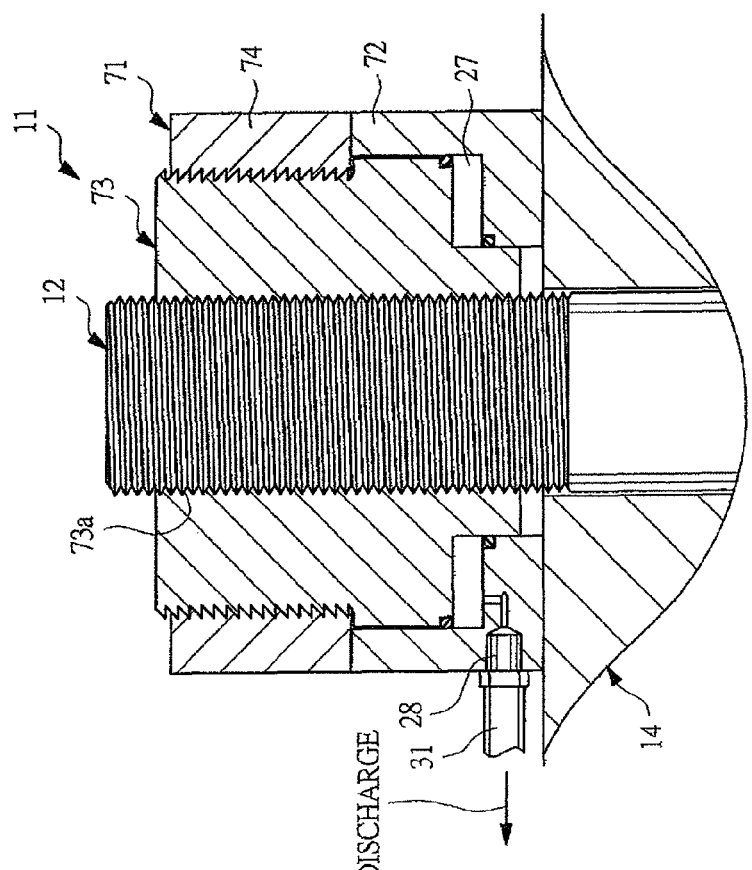
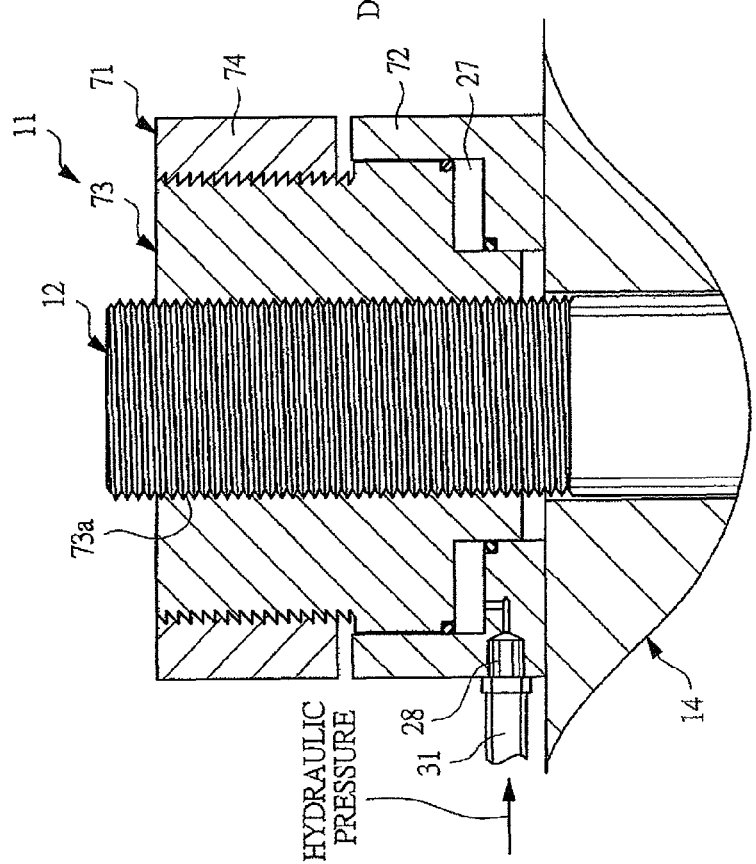

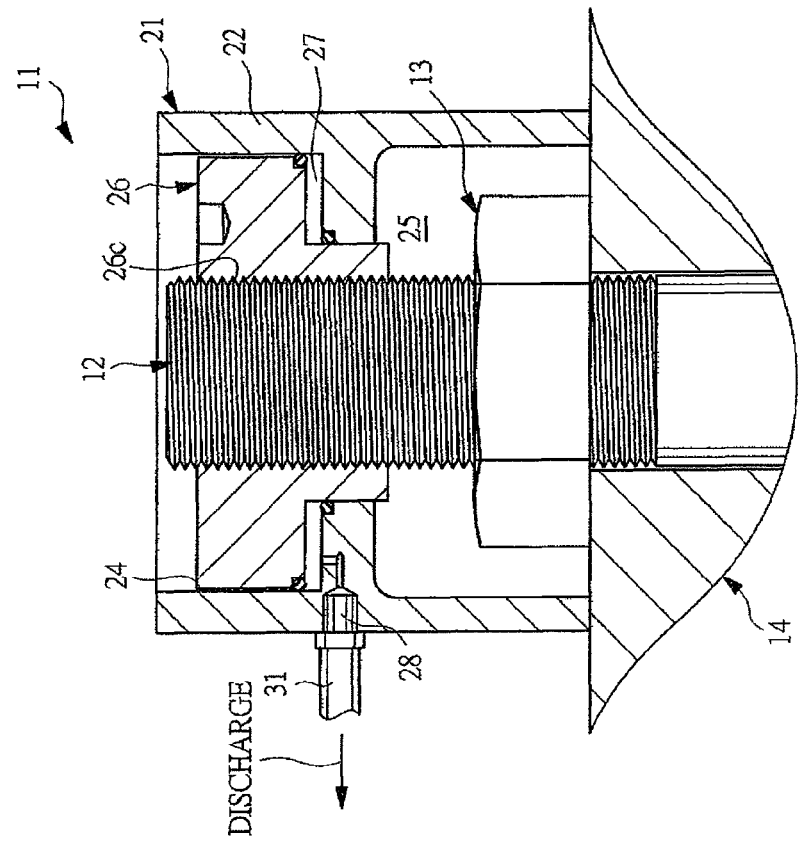
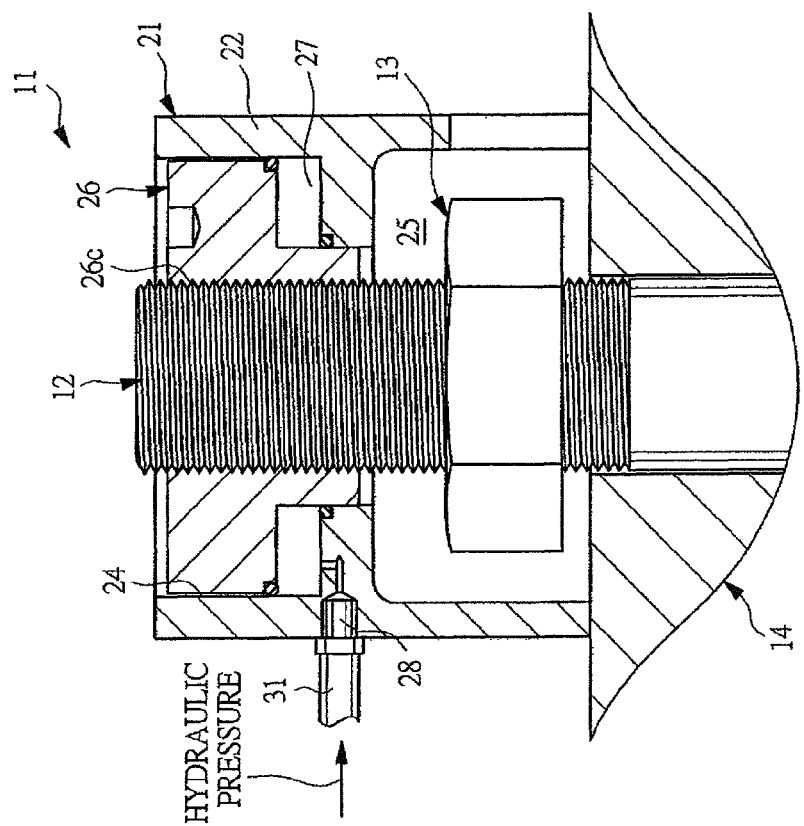

METHOD OF MEASURING AXIAL FORCE OF BOLT AND INSTRUMENT FOR MEASURING AXIAL FORCE OF BOLT

CROSS-REFERENCE TO RELATED APPLICATION

Applicant hereby claims foreign priority benefits under U.S.C. §119 from Japanese Patent Application No. 2010-11680 filed on Jan. 22, 2010, the contents of which are incorporated by reference herein.

TECHNICAL FIELD OF THE INVENTION

The present invention relates to a bolt-axial-force measuring method for measuring axial forces (fastening forces) of bolts, which are screw-joined to nuts and fasten members to be fastened (hereinafter "fastened members"), and to a bolt-axial-force measuring instrument used for the measuring method thereof.

BACKGROUND OF THE INVENTION

Conventionally, a variety of methods has been used as bolt-axial-force measuring methods for measuring the axial forces of the bolts, which are screw-joined to the nuts and fasten the fastened members.

A load cell method is a method in which: a load cell is sandwiched between an intermediate of a bolt to be fastened or a bolt and a fastened member; under that state, the bolt is fastened to compress the load cell; and a compressive force to be detected by the load cell is directly detected as an axial force of the bolt.

A strain gauge method is a method in which: a strain gauge (strain meter) is pasted on an axial peripheral part of the bolt; by a means of this strain gauge, the minimal axial-directional strain (elongation) generated in fastening the bolt is detected; and the bolt axial force is calculated based on this strain.

An ultrasonic method is a method in which: by using an ultrasonic oscillator and receiver, axial-directional length dimensions of the before-fastened and after-fastened bolts are measured precisely; and the bolt axial force is calculated based on elongations of the before-fastened and after-fastened bolts acquired from results of the measurements. For example, disclosed in Japanese Patent 1 (Japanese Patent Application Laid-Open Publication No. 2006-308342) is a method in which: an ultrasonic oscillator and receiver are placed on one axial-directional end surface of a before-fastened bolt; an ultrasonic wave is caused to be incident from a one end surface of the bolt; the axial-directional length of the before-fastened bolt is measured based on a time required until the reflected wave of the ultrasonic wave from the other axial-directional end surface of the bolt is received and, at the same time, the axial-directional length dimension of the after-fastened bolt is measured in the same manner after the bolt is fastened; and the bolt axial force is calculated based on the bolt elongations calculated from the results of these measurements.

A measuring stick method is a method in which: a measuring stick is inserted into a deep hole formed inside an axial center of the bolt; an amount of projection of the measuring stick from the deep hole before and after the fastening of the bolt is measured by a means of a length measuring instrument such as a dial gauge; and the bolt axial force is calculated based on the bolt elongation acquired from this measurement.

However, since the load cell method or the strain gauge method necessitate placing the load cell or pasting the strain gauge on each bolt, it is possible to use the methods when the axial forces of a small number of bolts are experimentally measured. However, when the axial forces of all of a large number of bolts provided in or on an apparatus and the like must be measured, since an installation operation of the apparatus and a measuring operation itself become complicated, it is difficult to adopt these methods.

In the ultrasonic method, a small type measuring instrument for measurement has been developed. However, in the ultrasonic method, there are many factors affecting measurement accuracy, such as a degree of parallelism of both axial-directional end surfaces of the bolt, finish surface roughness, uncertainty regarding replication at measurement locations of contacts of the ultrasonic oscillator and receiver, a difference between transmission rates of the ultrasonic waves due to quality of a material of the bolt, roughness and fineness of a crystal of the quality of the material of the bolt, a temperature at a measuring time (a change in the transmission rates of the ultrasonic waves), an influence of stress distribution inside the bolt at a time of being fastened, and response linearity and sensitivity adjustment of the ultrasonic oscillator and receiver. Hence, each measuring operation requires a certain degree of skill, and it is difficult to obtain the stably measured results with high accuracy. Further, although the measuring instrument having a function to correct the influences of those factors based on theories and experiences of each maker itself is also developed, since their basis is not revealed, there is no alternative but to believe data provided from the measuring method designated by the maker.

A method using the measuring stick needs to drill deep holes for all of the bolts as measuring targets. The drilling of the deep holes has a problem in that since it requires not a usual drilling machine but a drilling machine equipped with a special gun drill, a drilling cost becomes high. Further, in the method using the measuring stick, it is extremely difficult to obtain, for the following reason, theoretically a relationship between a standard stick length, which serves as a standard for measuring an axial-directional elongation value of the bolt, and a fastening effective length, which is necessary for conversion calculation into the bolt axial force, so that at present the elongation of the bolt is converted into the axial force using an empirical value and/or an approximately related formula. Namely, it is difficult to specify the actual axial force of the bolt because of mixed stresses per cross-sectional areas which are generated along with the above axial force at the respective cross-sectional shapes of a screw part, an axis part, and the other reaction force side screw part (or a bolt head part) of the bolt being different from one another, i.e., variation in each length direction of those parts. In addition, compressive stress distribution of a nut and the reaction force side seat surface, a shape of a flange to be fastened, elastic coefficient variation as a compressed-side system affected by a nipped gasket, and a partial deformation due to inclination of the screw itself that is engaged with the nut in an axial direction of the screw part also change depending on a degree of the fastening axial force. As a result, a distribution state of the amount of the axial-directional elongation of the bolt varies depending on a change of the axial force, and is extremely complex. Accordingly, it is extremely difficult to theoretically quantitatively evaluate a definite relationship between the measuring stick serving as a standard and the effective fastening length. Therefore, it is the usual common practice of controlling the estimated bolt fastening force based on the bolt elongation value that is calculated on the estimation of the bolt effective length generally by using an empirical value and a numerical value equivalent to a thickness of the fastened flange plus a bolt screw diameter, or its multiplied value by a safety factor.

SUMMARY OF THE INVENTION

An object of the present invention is to provide a bolt-axial-force measuring method, and a bolt-axial-force measuring instrument, which are capable of easily and precisely measuring the axial forces of the bolts.

A method of measuring an axial force of a bolt according to the present invention is a method of measuring an axial force of a bolt, which fastens a fastened member, the method comprising the steps of: applying a tensile force to the bolt using a tension means activated by supply of a hydraulic pressure; fastening the bolt to the fastened member by discharging the hydraulic pressure to release the tensile force; detecting, as an inflection point, a point where a change rate of a pressure change of the pressure chamber generated by discharge of the hydraulic pressure is suddenly reduced; and calculating the axial force of the bolt by multiplying a pressure value of the pressure chamber at the inflection point by a pressure receiving area of the pressure chamber.

The method of measuring an axial force of a bolt according to the present invention is such that a fluid pressure in the pressure chamber is discharged while being reduced by a pressure reducing means, and a pressure reducing time of the pressure chamber is elongated.

The method of measuring an axial force of a bolt according to the present invention is such that a plurality of the tension means corresponding to a plurality of the bolts which fasten the fastened member are provided; a plurality of the pressure reducing means, which are mutually different in pressure reducing characteristic and each of which corresponds to the pressure chamber of each of the tension means, are provided; and the fluid pressures to the respective tension means are simultaneously discharged while being reduced by the pressure reducing means so that a time lag is generated among respective occurrences at the inflection points of the pressure chamber.

The method of measuring an axial force of a bolt according to the present invention is such that the tension means comprises: a housing placed on the fastened member; a cylinder formed in the housing; a piston mounted in the cylinder, and partitioning and forming the pressure chamber with the cylinder; and a coupling means for coupling the piston to the bolt.

The method of measuring an axial force of a bolt according to the present invention is such that the nut is a fluid pressure nut comprising: a cylinder placed onto the fastened member; a piston having a screw-hole screw-joined to the bolt, and axially movably assembled into the cylinder to partition and form the pressure chamber with the cylinder; and a lock ring screw-joined to an outer peripheral surface of one of the cylinder and piston, and contacting with an end surface of the other of the cylinder and piston when the fluid pressure in the pressure chamber is discharged, the lock ring supporting a load of the piston, and that the fluid pressure nut functions also as the tension means.

An instrument for measuring an axial force of a bolt according to the present invention is an instrument for measuring an axial force of a bolt, which fastens a fastened member, the instrument comprising: a tension means activated by supply of a fluid pressure to a pressure chamber, and applying a tensile force to the bolt; a pressure sensor for detecting a pressure change of the pressure chamber when the fluid pressure is discharged from the pressure chamber and the tensile force is released; and an axial-force calculating means for detecting, as an inflection point, a point where a change rate of the pressure change of the pressure chamber detected by the pressure sensor is suddenly reduced, and for calculating the axial force of the bolt by multiplying a pressure value of the pressure chamber at the inflection point by a pressure receiving area of the pressure chamber.

The instrument for measuring an axial force of a bolt according to the present invention further comprises a pressure reducing means, in which the fluid pressure in the pressure chamber is discharged while being reduced, and which elongates a pressure reducing time of the pressure.

The instrument for measuring an axial force of a bolt according to the present invention further comprises: a plurality of the tension means corresponding to a plurality of the bolts that fasten the fastened member; and a plurality of the pressure reducing means, which are mutually different in pressure reducing characteristic and correspond to the respective tension means, wherein the fluid pressures to the respective tension means are simultaneously discharged while being reduced by the pressure reducing means, and a time lag is generated among respective occurrences at the inflection points of the pressure chamber.

The instrument for measuring an axial force of a bolt according to the present invention is such that the tension means is a bolt tensioner comprising: a housing placed on the fastened member; a cylinder formed in the housing; a piston mounted in the cylinder, and partitioning and forming the pressure chamber with the cylinder; and a coupling means for coupling the piston to the bolt.

The instrument for measuring an axial force of a bolt according to the present invention is such that the nut is a liquid pressure nut comprising: a cylinder placed onto the fastened member; a piston having a screw-hole screw-joined to the bolt, and axially movably assembled into the cylinder to partition and form the pressure chamber with the cylinder; and a lock ring screw-joined to an outer peripheral surface of one of the cylinder and piston, and contacting with an end surface of the other of the cylinder and piston when the fluid pressure in the pressure chamber is discharged, the lock ring supporting a load of the piston, and that the fluid pressure nut functions also as the tension means.

The instrument for measuring an axial force of a bolt according to the present invention is such that the axial-force calculating means includes a storage means for: storing, as common data in advance, discrimination information on measurement of a project, date and time of the measurement, application information, a type of the tension means, and a value of the pressure receiving area of the pressure chamber; and storing, as measured data, discrimination data of the measured bolt, a pre-pressure value applied to the pressure chamber, a pressure value of the pressure chamber at the inflection point, and the calculated axial force of the bolt, and that the storage means can extract and take in the data with an external microcomputer.

According to the present invention, when the axial force is generated by using the tension means actuated by the hydraulic pressure to add the tensile force to the bolt, a value of the hydraulic pressure plus the pressure receiving area of the pressure chamber in the tension means is equivalent to the bolt axial force. Such equivalence is used to add the tensile force to the bolt by the above tension means and to transfer, to the nut etc., the axial force applied by the tension means to put the bolt into a fastened state. In this process, the inflection point where the change rate of the pressure change inside the pressure chamber of the tension means is suddenly reduced is detected, and a value obtained by multiplying the pressure value of the pressure chamber at this inflection point by the pressure receiving area of the tension means is calculated as the axial force of the bolt fastened. Therefore, a difference between the lengths of the before-fastened bolt and the after-fastened bolt is not measured unlike the ultrasonic method and the measuring stick method, and the bolt axial force can be directly measured, so that variation factors which may influence the measurement accuracy of the blot axial force are reduced to the utmost, whereby the bolt axial force can be easily measured with good accuracy. As the tension means, the bolt tensioner and the fluid pressure nut that are activated with a fluid pressure (hydraulic pressure) can be used.

According to the present invention, the fluid pressure in the pressure chamber is discharged while being reduced by using the pressure reducing means, whereby the pressure reducing time of the pressure chamber is prolonged. For this reason, the detection of the inflection point is made easy, and the detection accuracy thereof can be enhanced. Further, since a low-cost apparatus constituted from a simple circuit(s) can be used as an apparatus for detecting the inflection point, a cost of the apparatus can be reduced.

According to the present invention, the plurality of tension means corresponding to the plurality of bolts are provided; the pressure reducing characteristics of the pressure reducing means corresponding to the pressure chambers of these tension means are made different; the hydraulic pressures with respect to the respective tension means are discharged simultaneously while being reduced by the pressure reducing means; and a time lag is generated among the respective occurrences at the inflection points of the pressure chamber. Therefore, the axial forces of a large number of bolts can be calculated sequentially by the single axial-force calculating means without providing a plurality of axial-force calculating means, so that the measuring operation is made easy, and that a cost of the measuring instrument can be reduced.

The present invention has such a structure that: the storage means for storing various kinds of common data and measuring data is provided to the axial-force calculating means; and the data can be extracted and taken in between this storage means and an external microcomputer. Therefore, the measuring operations of the bolts in the apparatus and the like provided with a large number of bolts are made easy, the reliability of the operation can be enhanced.

BRIEF DESCRIPTION OF THE DRAWINGS

FIG. 2A is a cross-sectional view showing a fastening procedure of the bolt by a bolt tensioner shown in FIG. 1, and is a view showing a state in which a tensile force is applied to the bolt;

FIG. 2B is a cross-sectional view showing a fastening procedure of the bolt by the bolt tensioner shown in FIG. 1, and is a view showing a state in which a nut is rotated by a handle and a nut adopter and is seated again on a fastened member;

FIG. 8A is a cross-sectional view showing a fastening procedure of the fluid pressure nut shown in FIG. 7 to the bolt, and is a view showing a state in which a tensile force is applied to the bolt;

FIG. 8B is a cross-sectional view showing the fastening procedure of the fluid pressure nut shown in FIG. 7 to the bolt, and is a view showing a state in which a lock ring is fastened up to a load supporting position;

FIG. 10A is a cross-sectional view showing a procedure to apply a tensile force to the bolt by the bolt tensioner shown in FIG. 9, and is a view showing a state in which the tensile force is applied to the bolt; and FIG. 10B is a cross-sectional view showing the procedure to apply the tensile force to the bolt by the bolt tensioner shown in FIG. 9, and is a view showing a state in which a hydraulic pressure in the pressure chamber is discharged

DESCRIPTION OF THE PREFERRED EMBODIMENTS

Figure 1:
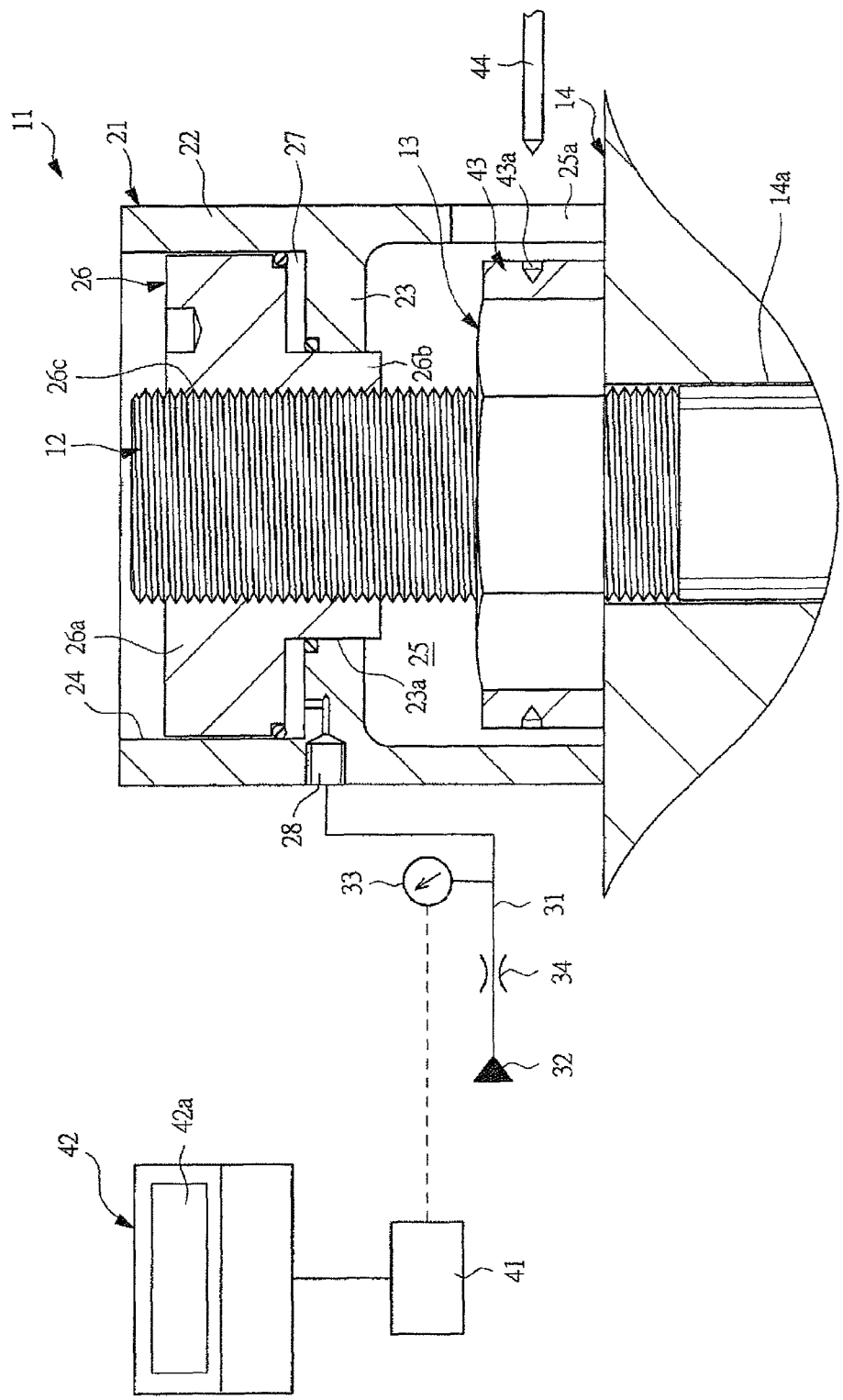
FIG. 1 is a block diagram of a bolt-axial-force measuring instrument according to one embodiment of the present invention.

An embodiment of the present invention will be described below in detail with reference to the accompanying drawings.

A bolt-axial-force measuring method according to an embodiment of the present invention is performed by using a bolt-axial-force measuring instrument 11 (hereinafter, referred to as "measuring instrument 11") shown in FIG. 1.

This measuring instrument 11 fastens a fastened member 14 with a large fastening force by screw-joining a nut 13 to a bolt 12 in a state in which an axial-directional tensile force is applied in advance to the bolt 12. Simultaneously, during its fastening operation, the measuring instrument 11 measures an axial force of the bolt 12 to be fastened. This measuring method and the measuring instrument 11 are applied, for example, in the cases where: a turbine case of a gas turbine used in a power plant such as an electric power plant is used as the fastened member 14; this fastened member 14 is fastened by the bolt 12 and the nut 13; the axial force of the fastened bolt 12, i.e., an fastening force is measured; and such measurement is controlled. In the illustrated case, the bolt 12 serves as a stud bolt planted in the fastened member 14.

This measuring instrument 11 includes a bolt tensioner 21 as a tension means for applying an axial-directional tensile force to the bolt 12.

This bolt tensioner 21 includes a housing 22 which is formed cylindrically from steel. A barrier rib 23 parallel to an axial direction is provided inside this housing 22, and an interior of the housing 22 is axially divided into two by the barrier rib 23. A cylinder 24 is provided at an upper side of the barrier rib 23, that is, at an opposite side to the fastened member 14, and a nut accommodation chamber 25 is provided at a lower side of the housing, that is, at a side of the fastened member 14.

The bolt tensioner 21 is placed on the fastened member 14 so as to conform an axial center of the housing 22 to that of the bolt 12, and to cover the bolt 12. Before the bolt tensioner 21 is disposed, the nut 13 is loosely screw-joined to the bolt 12 in advance. When the bolt tensioner 21 is disposed on the fastened member 14, this nut 13 is accommodated into the nut accommodation chamber 25 of the housing 22.

A piston 26 which is formed from steel is axially movably mounted in the cylinder 24 of the housing 22. This piston 26 includes a disc-shaped main body part 26a whose outer peripheral surface slidably contacts with an inner peripheral surface of the cylinder 24, and a boss part 26b having a diameter smaller than that of the main body part 26a integrally provided to one axial-directional end surface of the main body part 26a. The outer peripheral surface of this boss part 26b slidably contacts with an inner peripheral surface of a through-hole 23a which is formed at an axial center of the barrier rib 23. Further, the axial center of the piston 26 is provided with a screw hole 26c, which has a size capable of being screw-joined to the bolt 12 and is axially penetrated. This screw hole 26c functions as a coupling means for coupling the piston 26 to the bolt 12. When the bolt 12 is screw-joined to this screw hole 26c, the bolt 12 becomes coupled to the piston 26, and the bolt tensioner 21 is disposed in the fastened member 14.

The interior of the housing 22 is partitioned by the piston 26 and the cylinder 24, whereby a pressure chamber 27 is formed. When a hydraulic pressure is supplied to this pressure chamber 27, the piston 26 can be activated in the axial direction of being separate from the fastened member 14, whereby a tensile force is applied to the bolt 12 which is coupled to the piston 26.

To supply the hydraulic pressure to the pressure chamber 27, the housing 22 is provided with a filler port 28. The filler port 28 is opened at the outer peripheral surface of the housing 22, communicates with the pressure chamber 27, and is connected to a hydraulic feeder 32 via a piping 31. The hydraulic feeder 32 is constituted so that a hydraulic pressure is supplied to the pressure chamber 27 via the piping 31, and that the hydraulic pressure supplied to the pressure chamber 27 by opening the piping 31 to atmospheric air is discharged, as a result of which the pressure therein can be reduced.

Note that, in the present embodiment, the hydraulic pressure supplied to the pressure chamber 27 by the hydraulic feeder 32 is an ultrahigh pressure with a degree of several tens to several hundreds Mpa.

The piping 31 is provided with a pressure sensor 33 for detecting the pressure inside the pressure chamber 27. This pressure sensor 33 is a piezoelectric pressure sensor using a strain gauge as a pressure detector, that is, a pressure transmitter and detects, as the pressure inside the pressure chamber 27, the hydraulic pressure (fluid pressure) supplied to the piping 31, and outputs it as an electrical signal.

Note that the pressure sensor 33 is not limited to the pressure transmitter, and another type of pressure sensor may be used if it is capable of detecting the hydraulic pressure and its pressure change with high accuracy and good responsiveness.

Further, in the present embodiment, although the pressure sensor 33 is provided to the piping 31 which is connected to the filler port 28, the present invention is not limited to this, and may have, for example, such a structure that: an attachment screw hole that reaches the pressure chamber 27 is formed in the housing 22 and/or the piston 26; and the pressure sensor 33 is screwed and mounted into this attachment screw hole, as a result of which the pressure inside the pressure chamber 27 is detected directly by the pressure sensor 33.

An orifice plate 34 as a pressure reducing means is provided at a portion of the piping 31, which is located at a hydraulic feeder 32 side rather than at a pressure sensor 33 side, and when the hydraulic pressure in the pressure chamber 27 is discharged by this orifice plate 34, the hydraulic pressure is discharged while being reduced by the orifice plate 34. Thereby, a decrease rate of the pressure in the pressure chamber 27 when the hydraulic pressure is discharged is reduced, and a time required for the pressure reduction, that is, a pressure reducing time is prolonged as compared with the case where the orifice plate 34 is not provided.

This measuring instrument 11 is provided with a measuring apparatus 41 as an axial-force calculating means in order to analyze a pressure change of the pressure chamber 27, which is detected by the pressure sensor 33, and to calculate the axial force of the bolt 12 based on results of the analysis.

The pressure sensor 33 is connected to the measuring apparatus 41, and pressure values, that is, pressure data of the hydraulic pressure detected by the pressure sensor 33 are inputted to this measuring apparatus 41 as electrical signals. A memory (not shown) as a storage means is provided inside the measuring apparatus 41, and the pressure data inputted from the pressure sensor 33 is stored in this memory.

The measuring apparatus 41 is provided with an external connecting terminal, and is connected to a microcomputer 42 via this external connection terminal, and can perform data communication with the microcomputer 42. Namely, the data can be took into the memory of the measuring apparatus 41 from the microcomputer 42, and the data stored in the memory of the measuring apparatus 41 can be extracted and inputted to the microcomputer 42.

Note that common data necessary for a measuring operation of the axial force is inputted and stored through the microcomputer 42 into the memory of the measuring apparatus 41 in advance prior to the measuring operation. Stored as the common data into the memory in advance are measurement-project identification information for identifying a project that measures the axial force of the bolt 12, measurement data and time for the project, information on applications (analysis programs and calculation programs) which are used for the analysis of the pressure change and for the calculation of the axial force of the bolt 12 in the project, a type of the bolt tensioner 21 used for the project, and a pressure receiving area of the pressure chamber 27 of the bolt tensioner 21. Further, the measuring apparatus 41 is also adapted to store in the memory the measured data of the axial force of the bolt 12 measured in this project.

FIGS. 2A and 2B are cross-sectional views each showing a bolt fastening procedure by the bolt tensioner shown in FIG. 1, and FIG. 2A is a view showing a state in which a tensile force is applied to the bolt, and FIG. 2B is a view showing a state in which a nut is rotated by a handle and a nut adaptor so as to be seated again on the fastened member.

Next, a fastening procedure of the bolt 12 and the nut 13 using the bolt tensioner 21 will be described based on FIGS. 2A and 2B.

First, the nut 13 is screw-joined to a tip of the bolt 12 which is inserted into an inserting hole 14a of the fastened member 14, and a bearing surface of the nut 13 is seated on a surface of the fastened member 14. At this time, the nut 13 just needs to be loosely screw-joined, and there is no need to tightly screw-join the nut 13 in such a manner as to generate a large fastening force.

Next, the nut adaptor 43 is mounted outside the nut 13 which is screw-joined on the bolt 12. This nut adaptor 43 is constituted to be engaged with the outer peripheral surface of the nut 13, and to rotate together with the nut 13, and an engaging hole 43a with which the handle 44 can be engaged is provided in the outer peripheral surface of the nut adaptor 43.

After mounting the nut adaptor 43 into the nut 13, the bolt tensioner 21 is then placed on the fastened member 14 so as to accommodate the bolt 12 and the nut 13 into the nut accommodation chamber 25. At this time, the axial center of the housing 22 is conformed to the axial center of the bolt 12, and the piston 26 is rotated together with the housing 22, whereby the tip of the bolt 12 is screw-joined into the screw hole 26c of the piston 26, and the bolt 12 is coupled to the piston 26. In this manner, the bolt tensioner 21 is placed on the fastened member 14 in a state (a state shown in FIG. 1) in which the piston 26 is coupled to the tip of the bolt 12, and which the nut 13 screw-joined to the bolt 12 is accommodated into the nut accommodation chamber 25.

When the placement of the bolt tensioner 21 on the fastened member 14 is completed, the hydraulic feeder 32 is then activated, and the hydraulic pressure is supplied to the pressure chamber 27 of the bolt tensioner 21. When the hydraulic pressure is supplied to the pressure chamber 27, the pressure inside the pressure chamber 27 gradually increases. When the pressure rises up to a certain degree, the piston 26 moves in the axial direction of being separate from the fastened member 14 by the pressure, that is, the hydraulic pressure, and the tensile force from the piston 26 is applied to the bolt 12, whereby the piston 26 is elongated axially. When the pressure in the pressure chamber 27 is increased up to a predetermined pressure, the bolt 12 becomes elongated just a predetermined length dimension. As shown in FIG. 2A, the bolt 12 is held in a state in which the tensile force applied to the bolt 12 by the piston 26 and the axial force of the bolt 12 are balanced, and which a gap due to the elongation of the bolt 12 is produced between the nut 13 and the fastened member 14.

Here, in order to apply the tensile force to the bolt 12, a specified value of the hydraulic pressure supplied to the pressure chamber 27 is set to such a value (hereinafter, referred to as a "pre-pressure value") that the tensile force applied to the bolt 12 becomes larger than a necessary bolt-fastening axial force. Namely, in this fastening operation, the bolt 12 is elongated up to a length equal to or more than a length capable of generating the necessary bolt-fastening axial force by the bolt tensioner 21. Note that the necessary bolt-fastening axial force means the axial force of the bolt 12 necessary for generating a desired fastening force by the bolt 12 which is in a state in which the fastened member 14 after the fastening operation is fastened.

When the tension operation of the bolt 12 by the bolt tensioner 21 is completed, an operation for seating the nut 13 again on the fastened member 14 is then performed. The handle 44 inserted into the nut accommodation chamber 25 from a window part 25a formed at the nut accommodation chamber 25 is engaged with the engaging hole 43a of the nut adaptor 43, and the nut adaptor 43 is rotated by this handle 44, whereby the above operation is performed. As shown in FIG. 2B, this operation causes the nut 13 to be screwed up to a position contacting with a fastening surface of the fastened member 14 and to be seated on the fastened member 14.

Note that, in the present embodiment, although the nut 13 is rotated using the nut adaptor 43 and the handle 44, the present invention is not limited to this, and the nut 13 may be rotated using other tools such as spanners and wrenches.

When the nut 13 is seated on the fastened member 14, the hydraulic feeder 32 is then switched from a hydraulic pressure supply mode to a hydraulic pressure discharge mode, thereby discharging the hydraulic pressure in the pressure chamber 27. When the hydraulic pressure in the pressure chamber 27 is discharged, the pressure, that is, the hydraulic pressure in the pressure chamber 27 is gradually reduced, and the tensile force applied to the bolt 12 by the bolt tensioner 21 is released. When the tensile force is released, the bolt 12 tries to axially contract. At this time, however, since the nut 13 has already seated on the fastened surface of the fastened member 14, an amount of the contraction of the bolt 12 becomes smaller than an amount of the elongation caused by the tensile force, and the bolt 12 is fastened to the fastened member 14 while being kept in a state of generating a large residual axial force.

After the tensile force to the bolt 12 is released and the bolt 12 is fastened to the fastened member 14, the bolt tensioner 21 whose hydraulic pressure has been discharged is removed from the bolt 12, and the operation for fastening the bolt 12 and the nut 13 using the bolt tensioner 21 is completed.

Thus, the measuring instrument 11 applies, to the bolt 12 in advance by the bolt tensioner 21, the tensile force equal to or more than the necessary bolt-fastening axial force, and causes the nut 13 screw-joined to the bolt 12 to be seated on the fastened member 14. Thereafter, the measuring instrument 11 discharges the hydraulic pressure in the bolt tensioner 21, and lodges the axial force of the bolt 12 into the nut 13, thereby making it possible to fasten the fastened member 14 while being kept in a state of generating the large residual axial force in the bolt 12. Therefore, since the bolt 12 can be fastened to the fastened member 14 with the large residual axial force still being generated, the axial force of the bolt 12 at the time of the fastening, that is, a fastening force is made larger, and the fastened member 14 can be surely fastened. Note that the residual axial force of the bolt 12 in this fastened state becomes a predetermined bolt-fastening axial force.

Figure 3:
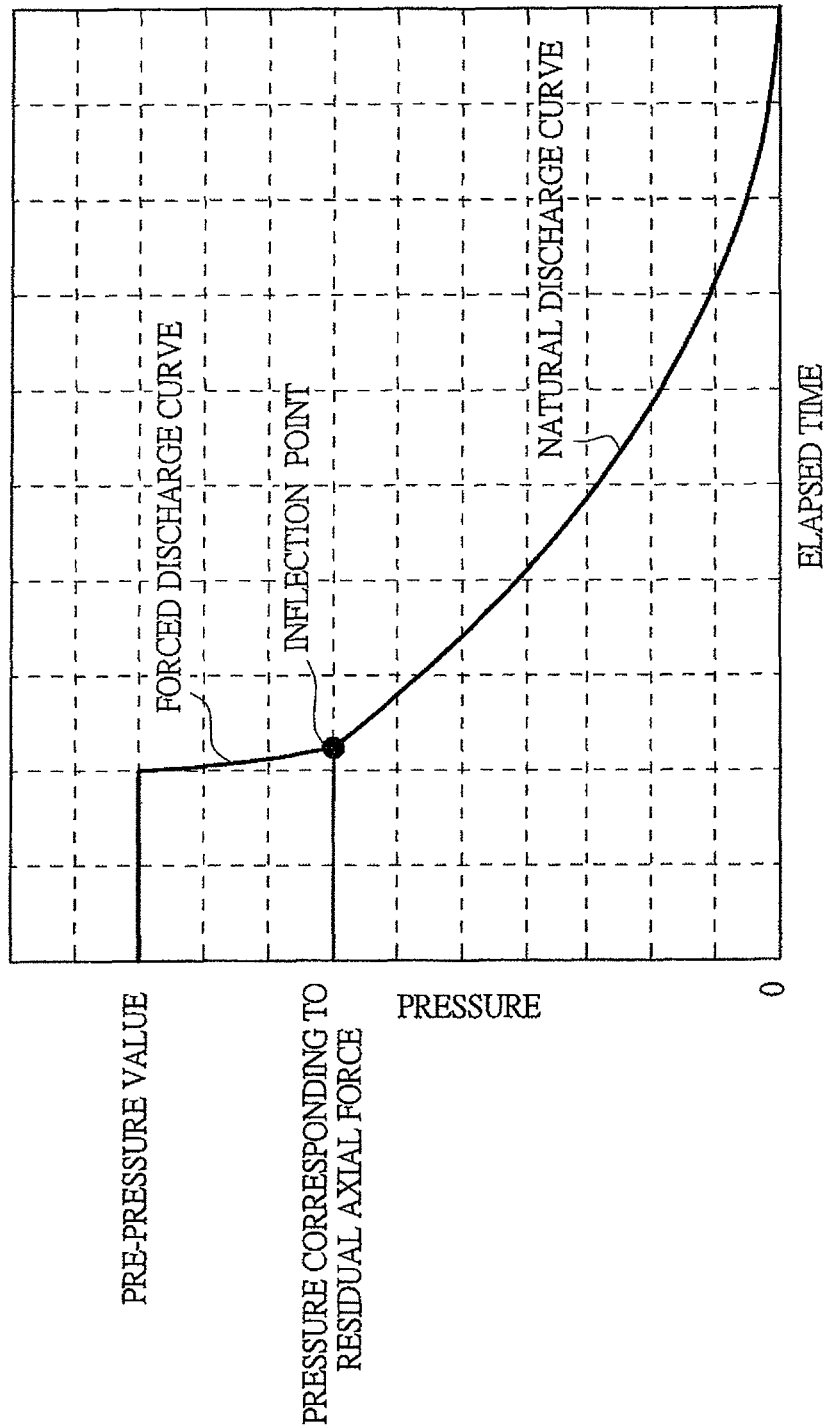
FIG. 3 is a characteristic diagram showing a pressure change of hydraulic pressures which are detected by a pressure sensor.

FIG. 3 is a characteristic diagram showing a pressure change of hydraulic pressures which are detected by the pressure sensor.

Meanwhile, in a bolt-axial-force measuring method according to the present invention, during the above bolt fastening operation using the bolt tensioner 21, the pressure sensor 33 detects a pressure change of the pressure chamber 27 when the hydraulic pressure in the bolt tensioner 21 that applies the tensile force to the bolt 12 is discharged; and the measuring apparatus 41 analyzes the pressure change of the pressure chamber 27 detected by the pressure sensor 33. Therefore, a point where a change rate of the pressure change is suddenly reduced, that is, a point where a change of a pressure decreasing rate (pressure decreasing acceleration) suddenly occurs is detected as an inflection point, and the pressure in the pressure chamber 27 at that inflection point is multiplied by the pressure receiving area of the pressure chamber 27, whereby the axial force of the bolt 12 in the fastened state is calculated. The procedure thereof will be described below.

To release the tensile force applied to the bolt 12, when the hydraulic feeder 32 is switched from the hydraulic pressure supply mode to the hydraulic pressure discharge mode, and when the hydraulic pressure is discharged from the pressure chamber 27 of the bolt tensioner 21, the pressure in the pressure chamber 27 is gradually reduced, as time elapses as shown in the characteristic diagram of FIG. 3, from a pressure value, that is, a pre-pressure value for generating an axial force equal to or more than the necessary bolt-fastening axial force in the bolt 12, and reaches a pressure of 0 (zero).

In this pressure reducing process, the measuring apparatus 41 detects, as an inflection point, a point where a change rate of the pressure change of the pressure chamber 27 generated by the discharge of the hydraulic pressure is suddenly reduced. Namely, the measuring apparatus 41 analyzes, on the time axis, the change rate of the pressure reduction of the pressure chamber 27 detected by the pressure sensor 33 when the hydraulic pressure is discharged, and detects, as an inflection point, the point where its change rate is suddenly reduced. This analysis is performed by analysis programs and the like of the applications stored in the memory of the measuring apparatus 41.

Here, while the necessary bolt-fastening axial force is stably held in the nut 13 from the pre-pressure value, that is, while the nut 13 is completely seated on the fastened member 14, strain elastic energy accumulated in the bolt 12 elongated by the tensile force is gradually released, whereby the pressure in the pressure chamber 27 is reduced steeply. Namely, huge strain elastic energy accumulated in the bolt 12 causes the piston 26 to move in a direction of narrowing a volume of the pressure chamber 27 so as to forcibly clear off the hydraulic pressure from inside the pressure chamber 27. Hence, a pressure reducing curve of the pressure chamber 27 becomes a forced discharge curve before the nut 13 is completely seated on the fastened member 14.

Meanwhile, when the nut 13 is completely seated on the fastened member 14, the residual pressure in the pressure chamber 27 is naturally discharged from the pressure chamber 27 later. Namely, after the nut 13 is completely seated on the fastened member 14, no forcible volume change of the pressure chamber 27 is generated by the strain elastic energy of the bolt 12. Therefore, the pressure in the pressure chamber 27 is discharged gently, and the pressure reducing curve thereof becomes a natural discharge curve.

Thus, if the time when the nut 13 is completely seated on the fastened member 14 is considered as a boundary, the change rate of the pressure change of the pressure chamber 27 suddenly changes at the boundary. Namely, a pressure at the point (a point of intersection between the forced and natural discharge curves) where the change rate of the pressure change of the pressure chamber 27 suddenly changes becomes a pressure equivalent to the axial force of the bolt 12 that has been in a fastened state.

Figure 4:
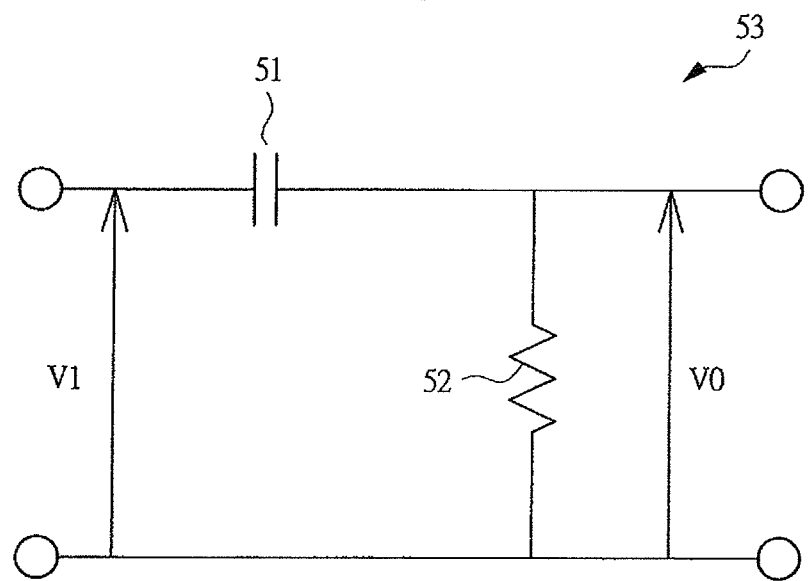
FIG. 4 is a circuit diagram of a differentiating circuit.

In the present embodiment, as shown in FIG. 4, the measuring apparatus 41 is provided with a detector circuit (electrical circuit) combining: a differentiation circuit 53 having a capacitor 51 and a resistor 52; and a filter circuit (not shown) for reducing noises. A detection signal, that is, an electrical signal (voltage V1) outputted every micro second from the pressure sensor 33 is continuously inputted to this detector circuit, and when an output value (voltage V0) of this detector circuit reaches a predetermined threshold value or more, it is determined that the change rate of the pressure in the pressure chamber 27 suddenly changes, and a point of such a change is detected as an inflection point.

Note that, in the present embodiment, as a method of detecting the inflection point where the change rate of the pressure change of the pressure chamber 27 is suddenly reduced, a method using the detector circuit provided with the differentiation circuit 53 is utilized. However, the present invention is not limited to this method, and may use another method, for example, in which: among pressure values continuously inputted in a unit of microsecond from the pressure sensor 33, average values of the inputted pressure values, which are arranged nearer to a desired calculation point, per predetermined number (for example, 60) are sequentially calculated; and when a difference between the calculated average values becomes larger than a threshold value set in advance, an inflection point is detected. In addition, although the differentiation circuit shown in FIG. 4 is a CR circuit, the present invention is not limited to this, and the differentiation circuit may be an LR circuit, an RCL circuit, and the like. Further, it may be not limited to a circuit of voltage reference (parallel), but may be a circuit of current reference (serial).

When the inflection point is detected based on the outputs of the differentiation circuit 53, the measuring apparatus 41 then multiplies the pressure value of the pressure chamber 27 at the inflection point by the pressure receiving area (area of a surface that is axially perpendicular to the piston 26 and partitions the pressure chamber 27) of the pressure chamber 27 of the bolt tensioner 21, the pressure receiving area thereof being stored in advance in the memory as common data, and the axial force of the bolt 12 is calculated. As described above, since the pressure in the pressure chamber 27 at the inflection point becomes a pressure corresponding to the axial force of the bolt 12 in the fastened state, when this pressure is multiplied by the pressure receiving area of the pressure chamber 27, the axial force of the bolt 12 in the state of fastening the fastened member 14 can be acquired.

As a calculating formula for calculating the axial force of the bolt 12 from the pressure value of the pressure chamber 27 at the inflection point and from the pressure receiving area of the pressure chamber 27, the calculation programs of the applications stored in advance in the memory of the measuring apparatus 41 are used.

In measuring such an axial force of the bolt 12, the measuring apparatus 41 stores, as the measured data in the memory, bolt identification data including information on which position in the apparatus the measured bolt 12 is located at, a pre-pressure value applied to the bolt 12 by the bolt tensioner 21, a pressure value (a hydraulic value) of the pressure chamber 27 at the inflection point, a value of the axial force of the bolt 12 calculated by multiplying the pressure value at the inflection point by the pressure receiving area of the pressure chamber 27, and the like. These measured data are transmitted to the microcomputer 42, and the data such as the pressure reducing curve of the pressure chamber 27 and the calculated axial force of the bolt 12 are displayed on a monitor 42a of the microcomputer 42.

Thus, in the present invention, the bolt tensioner 21 is used to apply to the bolt 12 the tensile force equal to or more than the necessary bolt-fastening axial force, and the hydraulic pressure is discharged from the pressure chamber 27 of the bolt tensioner 21 so as to release the tensile force with respect to the bolt 12; a process of reducing the hydraulic pressure from the pre-pressure value, which applies the tensile force to the bolt 12, to a pressure of 0 (zero) is detected by the pressure sensor 33; from the detected results, a point where the change rate of the pressure change of the pressure chamber 27 is suddenly reduced is detected as the inflection point; and the pressure in the pressure chamber 27 at the inflection point is multiplied by the pressure receiving area of the pressure chamber 27 to calculate the axial force of the bolt 12. Namely, unlike the ultrasonic method and the measuring stick method of measuring a difference between the lengths of the before-fastened bolt and after-fastened bolt, and calculating the bolt axial force by regarding this difference as a substitute specific value proportional to the bolt axial force, in the present invention the inflection point where the nut 13 is completely seated on the fastened member 14 is detected from the pressure reducing characteristic of the hydraulic pressure in the bolt tensioner 21, and the pressure value at the inflection point is multiplied by the pressure receiving area of the pressure chamber 27, whereby the axial force of the bolt 12 is calculated. In the above-mentioned present invention, detection accuracy of the inflection point becomes, without any change, measurement accuracy of the axial force of the bolt 12, so that the axial force of the bolt 12 can be directly measured. Therefore, variable factors affecting the measurement accuracy of the axial force of the bolt 12 are reduced to the utmost, and the axial force of the bolt 12 can be easily measured with good accuracy.

Further, in the operation process for fastening the bolt 12 and the nut 13 using the bolt tensioner 21, since the axial force of the bolt 12 can be measured by a simple method using the pressure values of the hydraulic pressure of the bolt tensioner 21, the axial force of the bolt 12 can be adjusted to a target axial force by a simple operation while the axial force of the bolt 12 is confirmed.

Moreover, since the fastening of the bolt 12 and the measurement of its axial force can be performed by such a simple operation, the operation for continuously fastening a large number of bolts can be rapidly and precisely performed.

Note that although a reduction of the hydraulic pressure discharged from the hydraulic pressure 27 is completed in an extremely short period of time, as an oscilloscope with a high frequency of 200 MHz is also commercially available by virtue of technological advancement of electronic equipment, the detected signals (electrical signals) from the pressure sensor 33 can be detected using the electrical circuit such as the differentiation circuit 53 with good accuracy even when a phenomenon to be measured, that is, the inflection point is a developmental event of a microsecond unit.

Meanwhile, when a hand-operated needle valve is used as a means for discharging the hydraulic pressure, valve resistance values vary at the time of discharging the hydraulic pressure by operating the needle valve, and there is a possibility that the inflection point may vary on the time axis. This variation causes no problem regarding the measuring if the frequency of the detection signals inputted from the pressure sensor 33 is sufficiently large, but when the measurement frequency is small, there is a possibility that determination of the inflection point may become unstable.

However, in the present invention, the orifice plate 34 having predetermined flow-rate resistance is provided in the piping 31 which connects the hydraulic feeder 32 and the pressure chamber 27, and by utilizing such a structure as to reduce and discharge the hydraulic pressure in the pressure chamber 27 by this orifice plate 34, the time to reduce the hydraulic pressure is prolonged. Hence, the inflection point can be detected with good accuracy even if the measurement is performed with low frequency. In this manner, by providing the appropriate orifice plate 34 to the piping 31 to elongate the pressure reducing time of the hydraulic pressure, a measurement point density is set as, for example, about 1/100 second cycle, whereby the measuring apparatus 41 that has, in practical accuracy, no problem of approximately processing several measured data in an electronic-numerical-value manner can be fabricated at low cost. In this case, the cost of the electrical (electronic) circuit such as the differentiation circuit 53 can be reduced using, as the electrical (electronic) circuit, a simple electrical (electronic) circuit which is smaller in output frequency, that is, lower in resolution. At the same time, in order to be able to secure the detection accuracy of the above inflection point, resistance coefficient of the orifice 34 for elongating the pressure reducing curve of the pressure change on the time axis may be made as large as possible within a range in which the measurement time is not elongated idly.

Note that, in the measuring method of the present invention, it is desired that the pressure reducing time of the hydraulic pressure is elongated by causing the hydraulic pressure to pass through the orifice plate 34 to detect the inflection point with good accuracy. Therefore, even if temperature and viscosity of the hydraulic pressure are changed, or even if a feature of the pressure reducing curve of the hydraulic pressure in the pressure chamber 27 is changed due to fabrication accuracy of the orifice plate 34, accuracy of the measurement result of the axial force of the bolt 12 is not affected by the changes.

Figure 5:
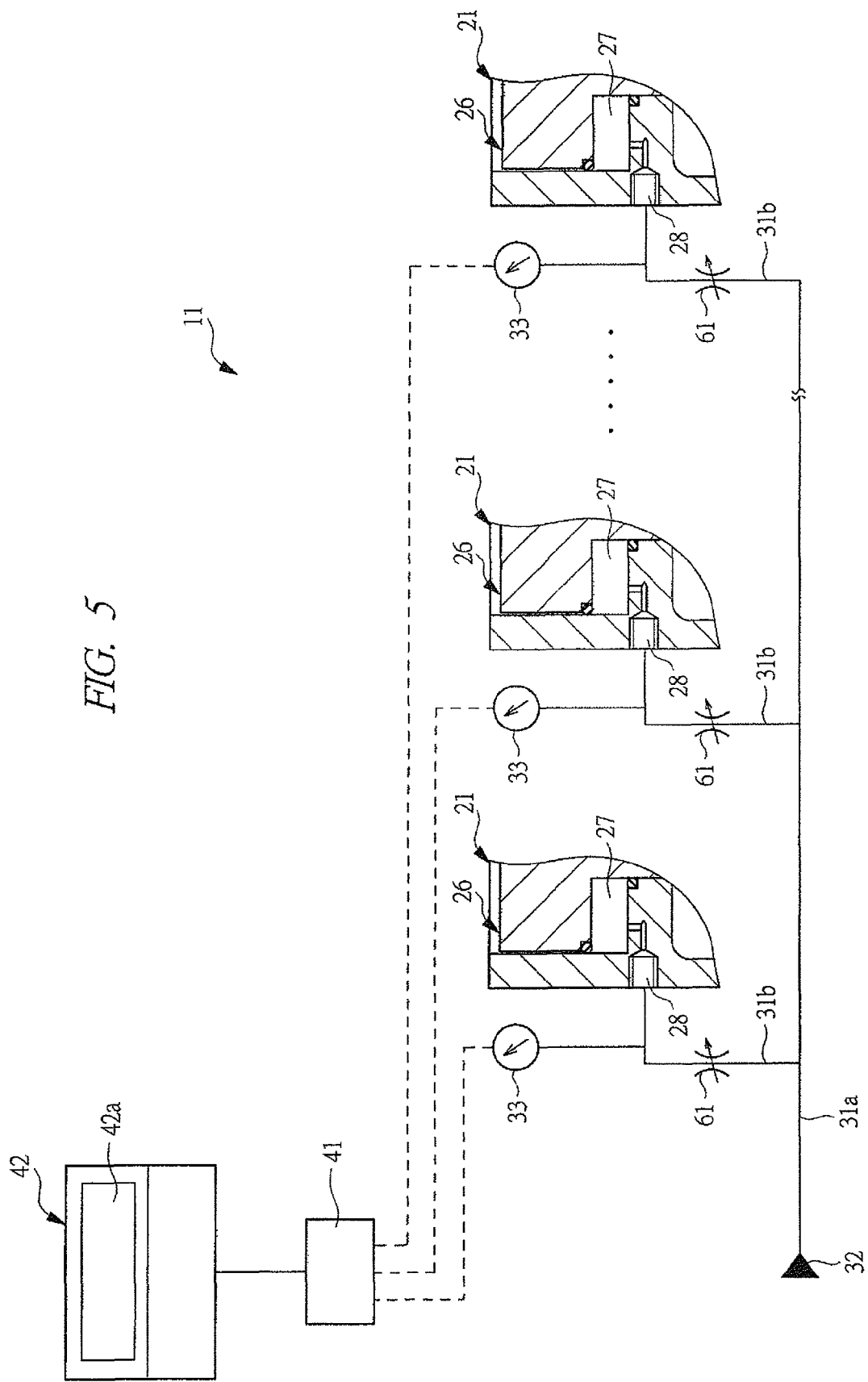
FIG. 5 is a modification of the bolt-axial-force measuring instrument shown in FIG. 1, and is a view showing the case where a plurality of bolt tensioners corresponding to a plurality of bolts are provided.
Figure 6:
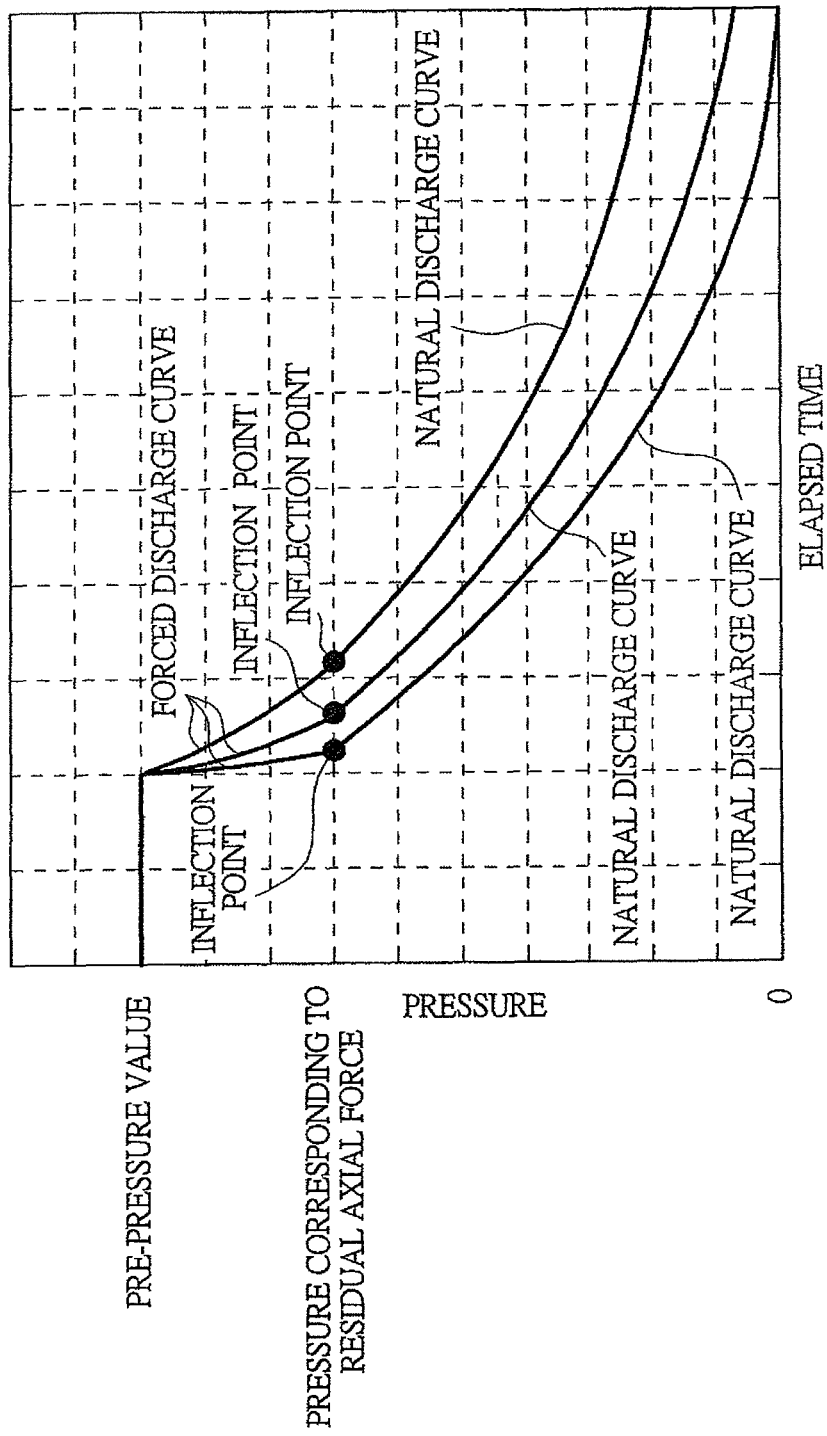
FIG. 6 is a characteristic diagram in which pressure changes of pressure chambers of the respective bolt tensioners shown in FIG. 5 are compared and indicated.

FIG. 5 is a modification of the bolt-axial-force measuring instrument shown in FIG. 1, and is a view showing the case where a plurality of bolt tensioners corresponding to a plurality of bolts are provided; and FIG. 6 is a characteristic diagram where pressure changes of pressure chambers of respective bolt tensioners shown in FIG. 5 are compared and indicated.

In the modification shown in FIG. 5, to collectively perform the fastening operation of a plurality of bolts 12 and the measurement of their axial forces with respect to the apparatus and the like having the plurality of bolts 12, the measuring instrument 11 is provided with a plurality of bolt tensioners 21 corresponding to the respective bolts 12. Each bolt tensioner 21 has the same structure as that shown in FIG. 1, and its filler port 28 is connected to each of sub-pipings 31b which are branched from a main piping 31a connected to the hydraulic feeder 32.

Each of the sub-pipings 31b is provided with an adjustable pressure reducing valve 61 which is a pressure reducing means for reducing and discharging the pressure in the pressure chamber 27. Each of these adjustable pressure reducing valves 61 is an adjustable type capable of adjusting a pressure reducing characteristic, and the respective adjustable pressure reducing valves 61 are adjusted to be mutually different in pressure reducing characteristic.

Note that, in the present embodiment, the adjustable pressure reducing valve 61 capable of adjusting the pressure reducing characteristic is used as a pressure reducing means, and the respective adjustable pressure reducing valves 61 are adjusted to be mutually different in pressure reducing characteristic, but the present invention is not limited to this, and a plurality of kinds of orifice plates 34 mutually different in pressure reducing characteristic may be provided for the sub-pipings 31b, respectively.

Each sub-piping 31b is provided with the pressure sensor 33, and the pressure in the pressure chamber 27 of the corresponding bolt tensioner 21 is detected by the pressure sensor 33. The measuring apparatus 41 is a multi-channel type having a number of input terminals, and each pressure sensor 33 is individually connected to the measuring apparatus 41. The measuring apparatus 41 is adapted to individually analyze and process the pressure data inputted from each pressure sensor 33.

Even in the operation for collectively measuring the axial forces of the plurality of bolts 12 by such a measuring instrument 11, first, the nut 13 is screw-joined to the tip of each bolt 12; the nut adaptor 43 is mounted into each nut 13; then, each bolt 12 is screw-joined to the piston 26 of the corresponding bolt tensioner 21; and the bolt tensioner 21 is placed on the fastened member 14.

When the arrangement of the respective bolt tensioners 21 to the corresponding bolts 12 is completed, the hydraulic feeder 32 is then activated to supply the hydraulic pressure to the pressure chamber 27 of each bolt tensioner 21 all at once. Thereby, the plurality of bolt tensioners 21 simultaneously starts activating, and the tensile forces are applied to the plurality of bolts 12 all at once.

When the predetermined tensile forces are applied to the respective bolts 12, respective operations for rotating the nut adaptors 43 and seating the nuts 13 on the fastened members 14 are then performed. When the seating operations for all the nuts 13 are finished, the hydraulic feeder 32 is switched from the hydraulic pressure supply mode to the hydraulic pressure discharge mode, and the hydraulic pressures are simultaneously discharged from the pressure chambers 27 of the respective bolt tensioners 21. Namely, since the pressure chambers 27 of the respective bolt tensioners 21 are all connected to the hydraulic feeder 32 via the main piping 31*a*, when the hydraulic feeder 32 is switched to the hydraulic pressure discharge mode, the hydraulic pressures in the pressure chambers 27 in all of the bolt tensioners 21 are simultaneously discharged.

Further, the adjustable pressure reducing valves 61 corresponding to the pressure chambers 27 of the respective bolt tensioners 21 are set to be mutually different in pressure reducing characteristic. Hence, even when the hydraulic pressures are simultaneously discharged from the pressure chambers 27 of the respective bolt tensioners 21, the times required for reducing the pressures in the respective pressure chambers 27 are mutually different. Namely, as shown in FIG. 6, the pressure reducing curve of the pressure chamber 27 of each bolt tensioner 21 becomes in a state in which its scales on the time axis are mutually shifted, and an occurrence time of the inflection point where a change rate of the pressure change is suddenly reduced is also shifted for every bolt 12, and a plurality of inflection points corresponding to the respective bolts 12 occur on the single time axis. As a result, the inflection points of the pressure changes of the pressure chambers 27 of the respective bolt tensioners 21 can be sequentially detected by the single measuring apparatus 41.

The measuring apparatus 41 that detects the inflection points of the pressure chambers 27 of the respective bolt tensioners 21 multiplies the pressure values of the corresponding pressure chambers 27 at the inflection points by the pressure receiving areas of the pressure chambers 27 in order of the detection of the inflection points, and calculates the axial forces of the bolts 12.

Thus, in the present invention, in the measuring instrument 11 provided with the plurality of bolt tensioners 21 as shown in FIG. 5, the pressure reducing characteristics of the adjustable pressure reducing valves 61 corresponding to the pressure chambers 27 of the respective bolt tensioners 21 are caused to differ from one another, and the hydraulic pressures in the pressure chambers 27 of the respective bolt tensioners 21 are simultaneously discharged while being reduced by the corresponding adjustable pressure reducing valves 61, and a time lag is generated among occurrences at the inflection points due to the pressure changes of the pressure chambers 27. Consequently, without providing a large number of measuring apparatuses 41, the inflection points due to the pressure changes of the pressure chambers 27 of the respective bolt tensioners 21 can be detected by the single measuring apparatus 41 with good accuracy. Thereby, without the need of repeating the measurement by sequentially installing, in each bolt 12, the measuring instrument 11 provided with the single bolt tensioner 21 as shown in FIG. 1, the measurement of the axial forces of the plurality of bolts 12 can be easily performed.

Figure 7:
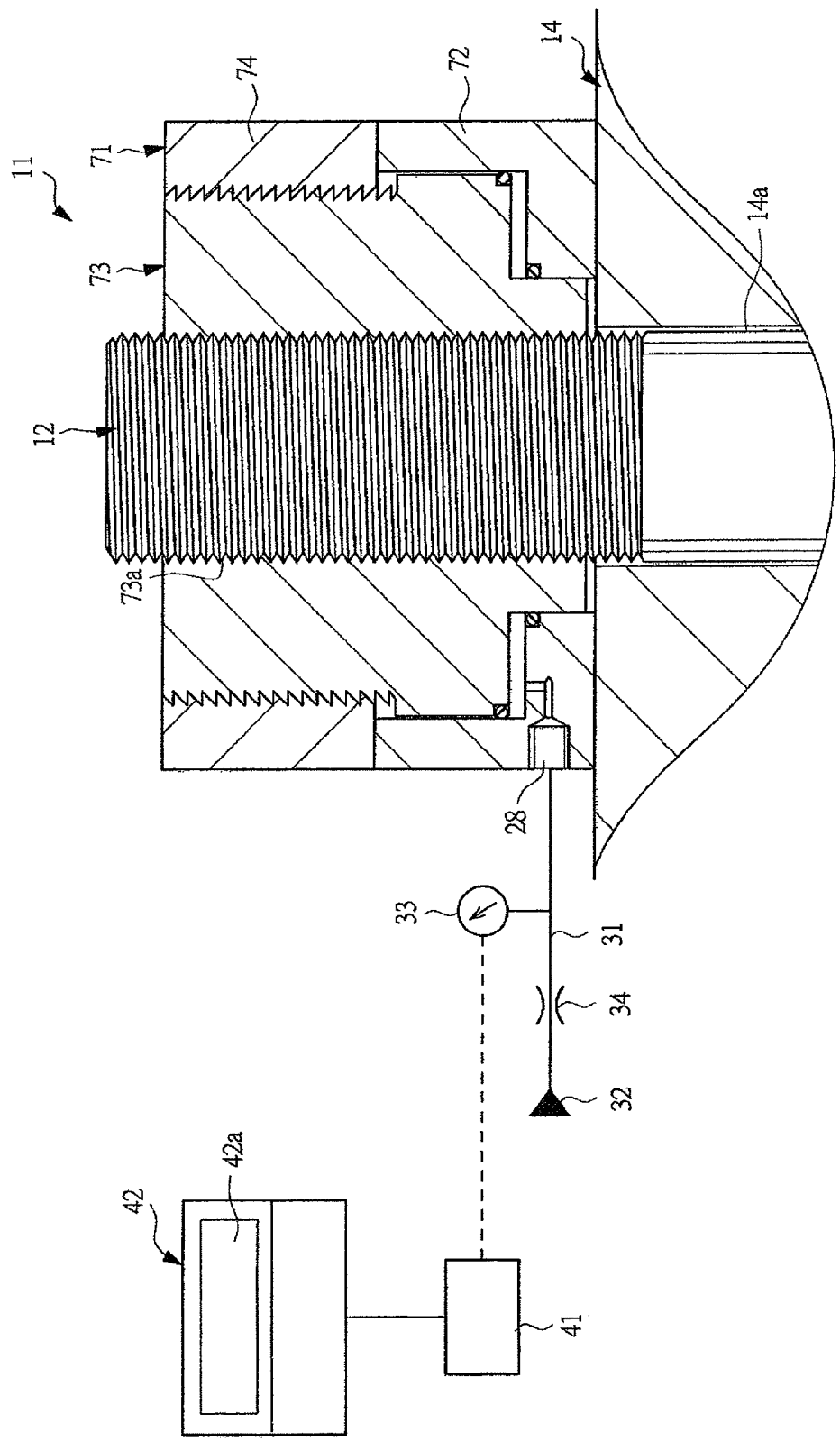
FIG. 7 is a modification of the bolt-axial-force measuring instrument shown in FIG. 1, and is a view showing the case where a fluid pressure nut is used as a tension means.

FIG. 7 is a modification of the bolt-axial-force measuring instrument shown in FIG. 1, and is a view showing the case where a fluid pressure nut is used as a tension means. FIGS. 8A and 8B are cross-sectional views showing the fastening procedures of the fluid pressure nut shown in FIG. 7 to the bolt, and FIG. 8A is a view showing a state in which a tensile force is applied to the bolt, and FIG. 8B is a view showing a state in which a lock ring is fastened up to a load supporting position.

In the modification shown in FIG. 7, a fluid pressure nut 71 is used as a nut screw-joined to the bolt 12. By supplying the hydraulic pressure to this fluid pressure nut 71, the tensile force is applied to the bolt 12 in advance, and under the state, the fluid pressure nut 71 is seated on the fastened member 14 so as to tightly fasten the fastened member 14. At the same time, based on the pressure change in discharging the hydraulic pressure supplied to the fluid pressure nut 71, the axial force of the bolt 12 is calculated. Namely, in this modification, the fluid pressure nut 71 is functioned as a tension means.

The fluid pressure nut 71 includes: a cylinder 72 formed from steel and into a bottomed cylindrical shape and placed on the fastened member 14; and a piston 73 cylindrically formed from steel and axially movably assembled to the cylinder 72. An outer peripheral surface of the piston 73 slidably contacts with an inner peripheral surface of the cylinder 72, and the pressure chamber 27 is partitioned and formed between the cylinder 72 and the piston 73.

A screw hole 73*a* having a size capable of being screw-joined to the bolt 12 is provided to axially penetrate the piston 73 along the axial center of the piston 73. This screw hole 73*a* functions as a coupling means for coupling the bolt 12 to the piston 73. Further, a lock ring 74 formed into a ring and from steel is screw-joined to the outer peripheral surface of the piston 73, and by this lock ring 74 being rotated against the piston 73, its axial-directional end surface (load supporting surface) is adapted to move in directions of approaching to and separating from the axial-directional end surface of the cylinder 72, that is, in the axial direction.

The cylinder 72 is provided with the filler port 28 communicating with the pressure chamber 27, and similarly to the measuring instrument 11 shown in FIG. 1, the hydraulic feeder 32 is connected to this filler port 28 via the piping 31, and the piping 31 is provided with the pressure sensor 33, and the orifice plate 34 serving as a pressure reducing means. The pressure sensor 33 is connected to the measuring apparatus 41 serving as an axial-force calculating means. Further, the microcomputer 42 is connected to the measuring apparatus 41. In this case, inputted into the memory of the measuring apparatus 41 are in advance a type of the fluid pressure nut 71, and data such as the pressure receiving area of the pressure chamber 27.

With this configuration, the bolt 12 is screw-joined to the screw hole 73*a* formed in the piston 73, and as a state in which the bolt 12 is coupled to the piston 73, the fluid pressure nut 71 is placed onto the fastened member 14. Under the state, the hydraulic feeder 32 is activated to supply the hydraulic pressure to the pressure chamber 27 of the fluid pressure nut 71, whereby the piston 73 is axially moved in the direction of separating from the fastened member 14, so that the tensile force can be applied to the bolt 12.

When the predetermined tensile force is applied to the bolt 12, the bolt 12 is elongated as shown in FIG. 8A, and a gap is generated between the axial-directional end surface of the lock ring 74 and the axial-directional end surface of the cylinder 72. Hence, as shown in FIG. 8B, the lock ring 74 is rotated, and the axial-directional end surface thereof is caused to abut on, that is, be seated on the axial-directional end surface of the piston 73. With this state being kept, when the hydraulic feeder 32 is switched from the hydraulic pressure supply mode to the hydraulic pressure discharge mode to discharge the hydraulic pressure in the pressure chamber 27, the axial force of the bolt 12 is supported by the cylinder 72 via the lock ring 74, and the bolt 12 tightly fastens the fastened member 14 with a large residual axial force still being generated.

Note that, in the present embodiment, the lock ring 74 is screw-joined to the outer peripheral surface of the piston 73, and the load of the piston 73 is supported by the cylinder 72 by causing the axial-directional end surface of the lock ring 74 to abut on the axial-directional end surface of the cylinder 72. However, the present invention is not limited to this, and may have such a structure that the lock cylinder 74 is screw-joined to the outer peripheral surface of the cylinder 72, and the axial-directional end surface thereof is caused to abut on the axial-directional end surface of the piston 73, whereby the load of the piston 73 is supported by the cylinder 72.

Meanwhile, even in the measuring method using the measuring instrument 11 as shown in FIG. 7, similarly to the case shown in FIG. 1, the pressure change of the pressure chamber 27 at the time of discharging the hydraulic pressure in the pressure chamber 27 is detected by the pressure sensor 33, and the detected pressure data is analyzed by the measuring apparatus 41, and the point where the change rate of the pressure change is suddenly reduced is detected as an inflection point. The pressure value of the pressure chamber 27 of the fluid pressure nut 71 at the detected inflection point is multiplied by the pressure receiving area (the pressure received area of the piston 73) of the pressure chamber 27 of the fluid pressure nut 71 which is stored in the memory in advance, whereby the axial force of the bolt 12 is calculated.

Even in the above-mentioned fastening operation of the bolt 12 using such a fluid pressure nut 71, the axial force of the bolt 12 can be measured while the operation for fastening the fastened member 14 is performed with the residual axial force still being generated in the bolt 12 by the fluid pressure nut 71. Therefore, the axial force of the bolt 12 can be adjusted up to a target axial force by a simple operation while the axial force of the bolt 12 is confirmed.

Figure 9:
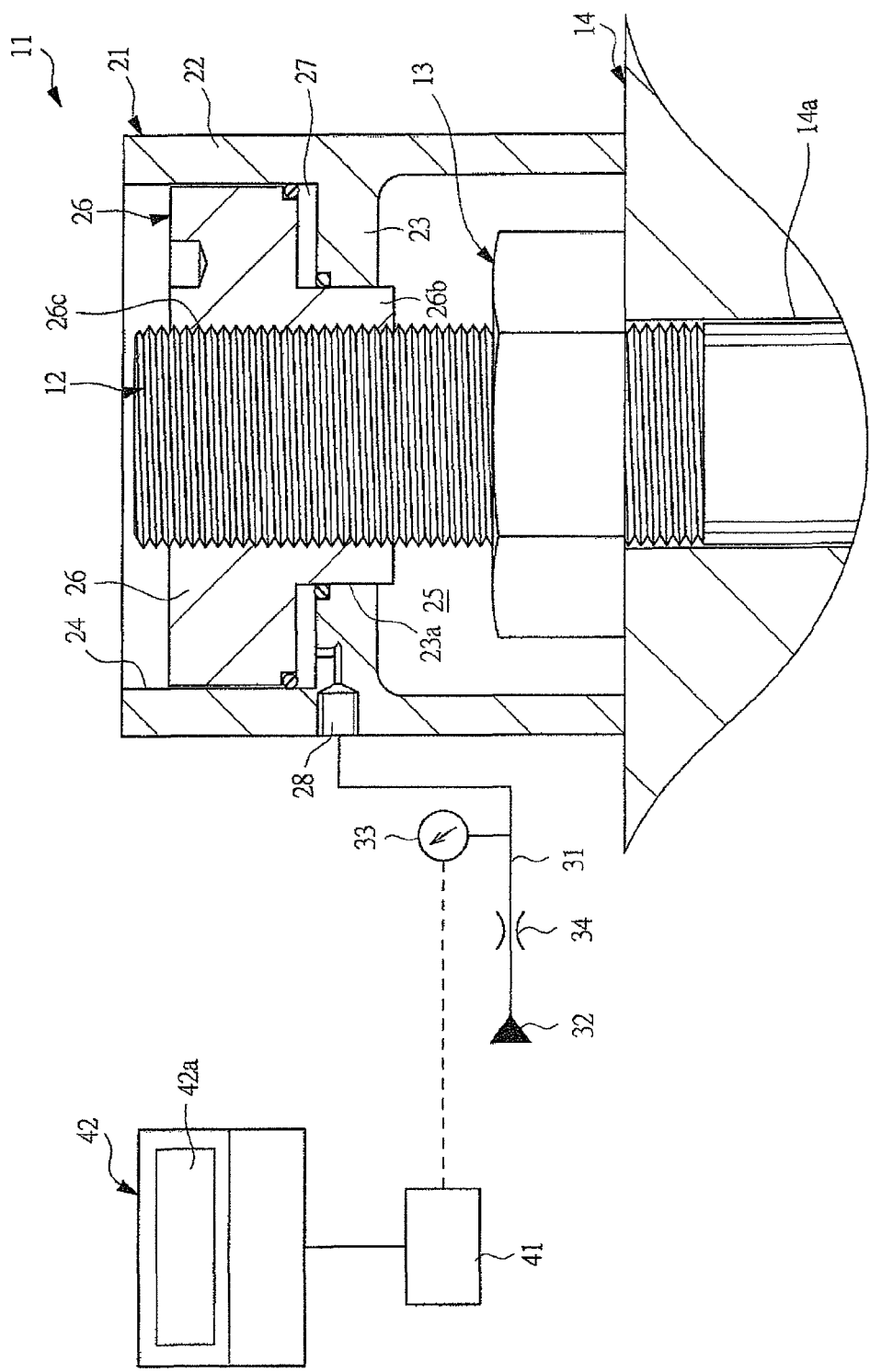
FIG. 9 is a modification of the bolt-axial-force measuring instrument shown in FIG. 1, and is a view showing the case where the axial force of the bolt already fastened is measured.

FIG. 9 is a modification of the bolt-axial-force measuring instrument shown in FIG. 1, and is a view showing the case where the axial force of the bolt already fastened is measured. Further, FIGS. 10A and 10B are cross-sectional views each showing a procedure to apply a tensile force to the bolt by the bolt tensioner shown in FIG. 9, and FIG. 10A is a view showing a state in which the tensile force is applied to the bolt, and FIG. 10B is a view showing a state in which the hydraulic pressure in the pressure chamber is discharged.

In the measuring methods shown in FIGS. 1 and 7, the nut 13 is screw-joined to the bolt 12 in a state in which the tensile force is applied to the bolt 12 in advance and, simultaneously, a fastening operation is performed to tightly fasten the fastened member 14, and the axial force of the bolt 12 is measured. However, the bolt-axial-force measuring method according to the present application is not limited to such a case, and can also be applied to the case where the axial force of the bolt 12 already fastened is measured using, for example, a torque wrench, a bolt heater, and the like.

In this case, although the tension means basically has the same structure as that of, for example, the bolt tensioner 21 shown in FIG. 1, the bolt tensioner 21 having a structure in which the nut adaptor 43 and the handle 44 as well as the window part 25a of the housing 22 are not provided is utilized.

As shown in FIG. 9, the bolt 12 in a state in which the nut 13 is already screw-joined, and which the fastened member 14 is fastened is screw-joined to the screw hole 26c in the piston 26 of the bolt tensioner 21, and is coupled to the piston 26. Under this state, as shown in FIG. 10A, the hydraulic pressure is supplied to the pressure chamber 27 of the bolt tensioner 21, and the predetermined tensile force is applied to the bolt 12. Next, the hydraulic pressure in the pressure chamber 27 is discharged, and as shown in FIG. 10B, the nut 13 is completely seated back on the fastened member 14. The pressure change of the pressure chamber 27 at the time of discharging this hydraulic pressure is detected by the pressure sensor 33 in the same manner as the case of the measuring apparatus 41 shown in FIG. 1, and is analyzed by the measuring apparatus 41, and the inflection point where the change rate of the pressure change is suddenly reduced is detected. Then, the pressure value of the pressure chamber 27 at the detected inflection point is multiplied by the pressure receiving area (pressure receiving area of the piston) of the pressure chamber 27 stored in the memory in advance, whereby the axial force of the bolt 12 is calculated.

Thus, as long as the bolt 12 with a projection amount from the nut 13 has enough a length to be coupled by the screw-joint to the screw hole 26c provided in the piston 26, even if the above bolt 12 is in a state in which the fastened member 14 is already fastened together with the nut 13, the present invention can measure the axial force of the bolt 12.

Note that, in FIGS. 5 and 7 to 10, the same reference numerals are denoted to members corresponding to the member described above.

The present invention is not limited to the embodiment described above and, needless to say, may variously modified within a scope of not departing from the gist thereof. For example, in the foregoing embodiment, although the bolt 12 whose axial force is measured is mentioned as a stat bolt, the present invention is not limited to this, and the bolt 12 may be an ordinary bolt in which a head part and an axial part are unitized.

Further, in the foregoing embodiment, although the orifice plate 34 and the adjustable pressure reducing valve 61 are used as a pressure reducing means, the present invention is not limited to these, and a pressure reducing means having such other structures as to be capable of reducing and discharging the hydraulic pressure, for example, a fixed flow-rate resistance type pressure-reducing valve and the like, may be used.

Furthermore, in the foregoing embodiment, there is a very small change in the pressure receiving areas of the pressure chambers 27 due to deformation of the parts such as the bolt tensioner 21 and the fluid pressure nut 71 because of the supply of the hydraulic pressure, that is, due to expansion and contraction deformation of the parts, and since the above deformation does not become factors largely influencing the measuring result of the axial force of the bolt 12 calculated eventually, the pressure receiving area of the pressure chamber 27 is treated as a constant. However, the present invention is not limited to the above, and may adapt a method of determining, by calculation, the change of the pressure receiving area of the pressure chamber 27 due to the supply of the hydraulic pressure, and correcting a changed amount of the pressure receiving area to calculate the axial force of the bolt 12.

Furthermore, in the foregoing embodiment, although the bolt tensioners 21 shown in FIGS. 1 and 9 and the fluid pressure nut 71 shown in FIG. 7 are used as tension means, the present invention is not limited to the above, and may adapt a tension means having such other structures as to be operated by a fluid pressure such as a hydraulic pressure or water pressure, and be able to apply the tensile force to the bolt 12 by the fluid pressure.

What is claimed is:

1. A method of measuring an axial force of a bolt, which fastens a fastened member, the method comprising the steps of:

applying a tensile force to the bolt using a tension means of a measuring instrument activated by supply of a hydraulic pressure to a pressure chamber of the measuring instrument;

fastening the bolt to the fastened member by discharging the hydraulic pressure from the pressure chamber of the measuring instrument to release the tensile force;

detecting, as an inflection point, a point where a change rate of a pressure change of the pressure chamber of the measuring instrument generated by discharge of the hydraulic pressure is suddenly reduced; and calculating, at a measuring apparatus of the measuring instrument, the axial force of the bolt by multiplying a pressure value of the pressure chamber at the inflection point by a pressure receiving area of the pressure chamber.

2. The method of measuring an axial force of a bolt according to claim 1, wherein a fluid pressure in the pressure chamber is discharged while being reduced by a pressure reducing means, and a pressure reducing time of the pressure chamber is elongated.

3. The method of measuring an axial force of a bolt according to claim 2, wherein a plurality of the tension means corresponding to a plurality of the bolts which fasten the fastened member are provided, a plurality of the pressure reducing means, which are mutually different in pressure reducing characteristic and each of which corresponds to the pressure chamber of each of the tension means, are provided, and the fluid pressures to the respective tension means are simultaneously discharged while being reduced by the pressure reducing means so that a time lag is generated among respective occurrences at the inflection points of the pressure chamber.

4. The method of measuring an axial force of a bolt according to claim 1, wherein the tension means comprises:

a housing placed on the fastened member;

a cylinder formed in the housing;

a piston mounted in the cylinder, and partitioning and forming the pressure chamber with the cylinder; and a coupling means for coupling the piston to the bolt.

5. The method of measuring an axial force of a bolt according to claim 1, wherein the nut is a fluid pressure nut comprising:

a cylinder placed onto the fastened member;

a piston having a screw-hole screw-joined to the bolt, and axially movably assembled into the cylinder to partition and form the pressure chamber with the cylinder; and a lock ring screw-joined to an outer peripheral surface of one of the cylinder and piston, and contacting with an end surface of the other of the cylinder and piston when the fluid pressure in the pressure chamber is discharged, the lock ring supporting a load of the piston, and the fluid pressure nut functions also as the tension means.

\* \* \* \* \*